June 28, 1932.  R. BEUTNER ET AL  1,864,635
DRIVING MECHANISM FOR THE ROUGHING ROLLS OF A CARD ROUGHING MACHINE
Filed July 23, 1929   2 Sheets-Sheet 1
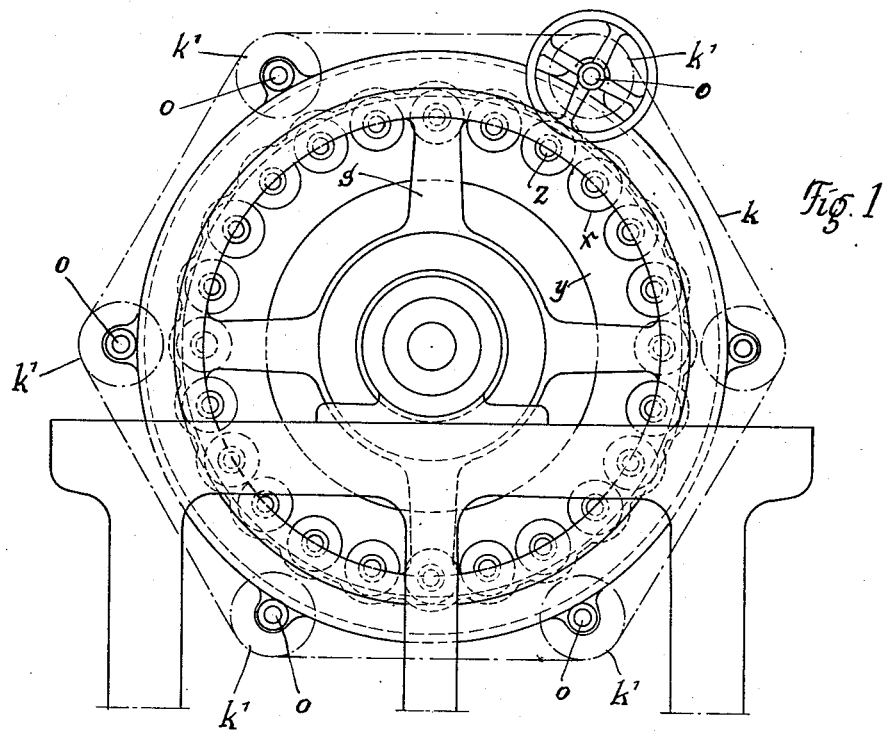
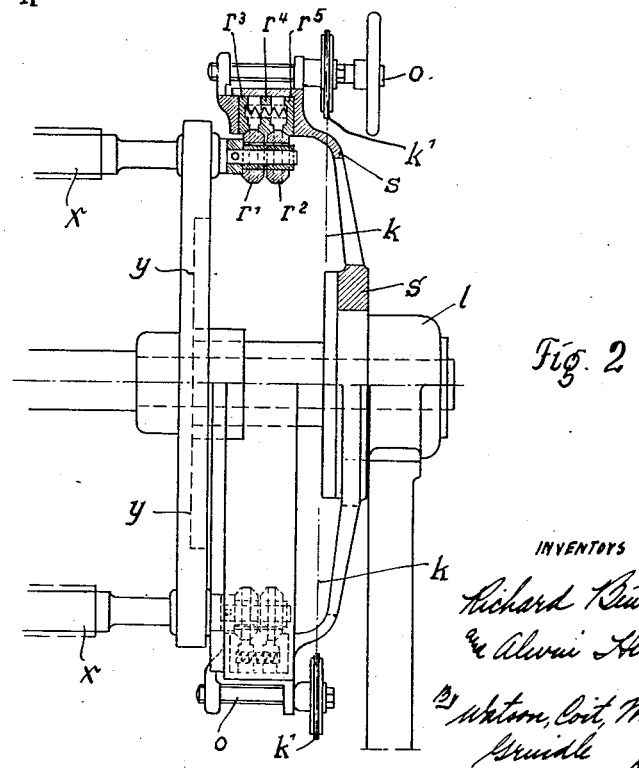

June 28, 1932.  R. BEUTNER ET AL  1,864,635
DRIVING MECHANISM FOR THE ROUGHING ROLLS OF A CARD ROUGHING MACHINE
Filed July 23, 1929   2 Sheets-Sheet 2

INVENTORS
Richard Beutner
Alwin Hille

By Watson, Coit, Morse & Grindle
Attys

Patented June 28, 1932

1,864,635

UNITED STATES PATENT OFFICE

RICHARD BEUTNER AND ALWIN HILLE, OF NEUGERSDORF, GERMANY

DRIVING MECHANISM FOR THE ROUGHING ROLLS OF A CARD ROUGHING MACHINE

Application filed July 23, 1929, Serial No. 380,369, and in Germany July 27, 1928.

Our invention relates to drives for the roughing rolls of a card roughing machine without belts, and it is an object of our invention to improve a drive of this kind.

To this end we provide a friction drive for the card roughing or nap raising cylinders, with friction wheels on the shafts of the cylinders, and friction means for rotating the wheels, means for applying the friction means to the wheels so as to balance axial thrust, and means for imparting relative rotation to the part on which the cylinders are carried, and the part on which the friction means are carried.

In a preferred embodiment of our invention we provide a rotary spider in which the cylinders are carried, and a stationary support for the friction means, but we are not limited to this but may conversely combine a stationary spider with a rotary support for the friction means, without departing from our invention. Preferably, a set of, preferably bevel, friction wheels are arranged on the shaft of each cylinder, and so many friction rings are provided that the beveled face of each wheel is engaged by two rings so that axial thrusts are balanced. Means are provided for exerting thrust on the friction rings, and preferably the pressure may be variable so as to vary the conditions under which the cylinders are rotated. Heavy pressure results in a positive connection while slight pressure yields a more sliding or slipping connection.

By providing any number of wheels and rings on the shaft of each cylinder, with a corresponding number of friction faces, the drive is rendered very uniform, the pressure per unit of area is reduced and so is the power input.

By varying the pressure on the friction wheels as described the action of the cylinders is varied from the maximum to the mildest action.

In the accompanying drawings a machine embodying our invention is illustrated.

Fig. 1 is an end elevation of the machine,

Fig. 2 is a partly sectional elevation,

Figure 4:
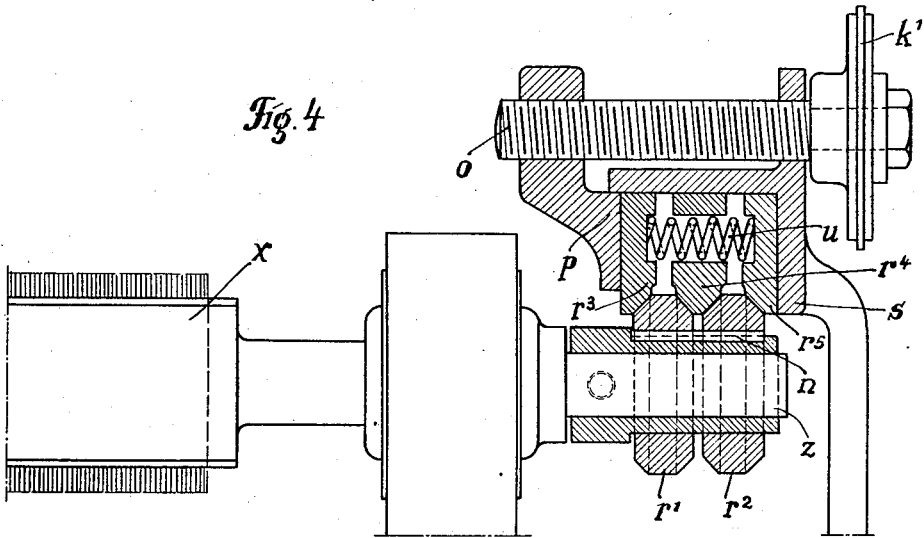
Fig. 4 shows mechanism including a threaded spindle, for the same object.

Referring now to Figs. 1, 2 and 4, $y$ is a spider on a shaft to which rotation is imparted by any suitable means, not shown, $x$ are roughing cylinders on the spider, $r'$, $r^2$ are beveled friction wheels on the shaft $z$ of each cylinder, and $r^3$, $r^4$, $r^5$ are friction rings for cooperation with the wheels. $s$ is a support for the rings which is arranged concentrically with respect to the axis of the spider shaft, the rings being abutted on a shoulder on one side of the support $s$, forced apart by a spring $u$, and pressed against the faces of the wheels by an annulus $p$ under the action of a threaded spindle $o$. Several spindles $o$ are arranged around the axis of the system as shown in Fig. 1, $k'$ is a sprocket on each spindle, $k$ is an endless chain on the sprockets, and one of the spindles is provided with a hand wheel from which all spindles are rotated through the chain $k$.

Figure 3:
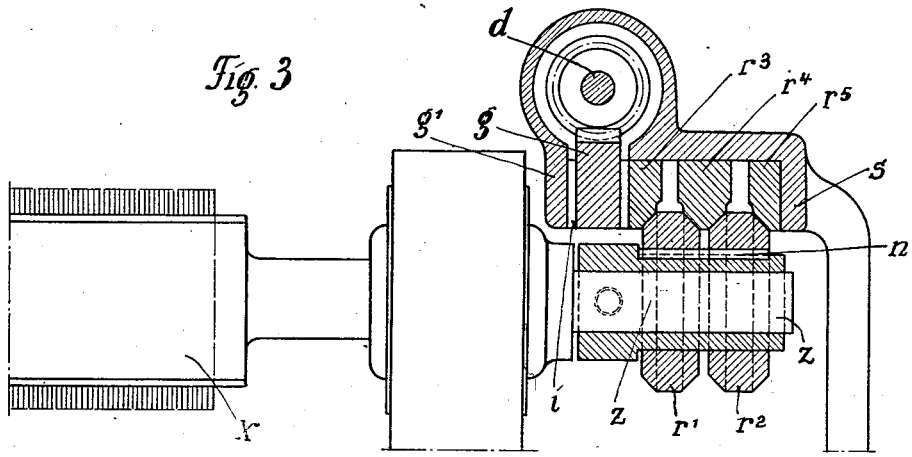
Fig. 3 shows a mechanism including worm gear for exerting pressure on the friction wheels and rings.

Referring to Fig. 3, $g$ is part of a worm wheel which is carried in the support $s$, $g'$ is a camming face on the support, and $i$ is a camming face on the worm wheel. The camming faces cause the worm wheel to exert thrust on the rings when it is rotated, or to release the rings. Rotation is imparted to the wheel $g$ by a worm $d$.

The wheels are splined on their shafts at $n$ so that they may move axially as required for uniform distribution of forces.

As mentioned, the spider $y$ might be stationary, and the support $s$ might rotate. Any number of wheels and rings may be provided, and they may have any other shape than the bevels illustrated. Instead of being arranged between the rings, as shown, the springs $u$ might be provided between the wheels, and springs might also be inserted between the rings and the support at the rear of the rings.

We claim:

1. In a card roughing machine, the combination with a plurality of roughing rolls, of a rotatable carrier in which said rolls are journalled, friction gears carried by said rolls, cooperating friction means for engaging said gears, means for rotating said carrier with respect to said friction means whereby rotation on their individual axes and rotation about the carrier axis will be simultaneously imparted to said rolls, and means for varying the contact pressure between said gears and friction means to control the degree of slippage therebetween and thereby the speed with which said rolls are driven.

2. In a card roughing machine, the combination with a plurality of roughing rolls, of a rotatable carrier in which said rolls are journalled, friction gears carried by said rolls, annular friction means held against rotation and forming an orbit on which said gears may roll, means for rotating said carrier whereby rotation on their individual axes and rotation about the carrier axis will be simultaneously imparted to said rolls, and means for varying the contact pressure between said gears and friction means to control the degree of slippage therebetween and thereby the speed with which said rolls are driven.

3. The combination recited in claim 2 in which said annular friction means comprises a pair of annular elements spaced axially and disposed on either side of said gears, said elements and gears having cooperating beveled friction surfaces, means for resiliently urging said elements apart, and means for positively forcing said elements toward each other to control the degree of frictional contact between said elements and said gears.

In testimony whereof we affix our signatures.

RICHARD BEUTNER.
ALWIN HILLE.